(12) United States Patent
Xiao

(10) Patent No.: US 11,349,782 B2
(45) Date of Patent: May 31, 2022

(54) STREAM PROCESSING INTERFACE STRUCTURE, ELECTRONIC DEVICE AND ELECTRONIC APPARATUS

(71) Applicant: Shenzhen Corerain Technologies Co., Ltd., Shenzhen (CN)

(72) Inventor: Mengqiu Xiao, Shenzhen (CN)

(73) Assignee: SHENZHEN CORERAIN TECHNOLOGIES CO., LTD., Shenzhen (CN)

( * ) Notice: Subject to any disclaimer, the term of this patent is extended or adjusted under 35 U.S.C. 154(b) by 16 days.

(21) Appl. No.: 16/962,452

(22) PCT Filed: Jan. 15, 2018

(86) PCT No.: PCT/CN2018/072661
§ 371 (c)(1),
(2) Date: Jul. 15, 2020

(87) PCT Pub. No.: WO2019/136749
PCT Pub. Date: Jul. 18, 2019

(65) Prior Publication Data
US 2021/0075743 A1 Mar. 11, 2021

(51) Int. Cl.
*H04L 49/00* (2022.01)
*G06N 3/08* (2006.01)
*H04L 65/60* (2022.01)

(52) U.S. Cl.
CPC .......... *H04L 49/3063* (2013.01); *G06N 3/08* (2013.01); *H04L 65/60* (2013.01)

(58) Field of Classification Search
CPC ........ H04L 49/3063; H04L 65/60; G06N 3/08
See application file for complete search history.

(56) References Cited

U.S. PATENT DOCUMENTS 4,835,731 A * 5/1989 Nazarenko ............ H04L 1/1887
455/508
4,845,722 A * 7/1989 Kent ....................... G06F 11/22
370/388
(Continued)

FOREIGN PATENT DOCUMENTS

| CN | 1936873 | 3/2007 |
| CN | 101344870 | 1/2009 |
| CN | 106597920 | 4/2017 |

OTHER PUBLICATIONS

International Search Report of PCT/CN2018/072661 dated Oct. 22, 2018.

*Primary Examiner* — Azizul Choudhury
(74) *Attorney, Agent, or Firm* — Woodard, Emhardt, Henry, Reeves & Wagner, LLP

(57) ABSTRACT

Disclosed are a streaming processing interface structure, an electronic device and an electronic apparatus. The streaming processing interface structure includes: a control streaming dam, including an uplink control pin and a downlink control pin; a first logic unit, which is connected to an uplink object and the uplink control pin, and is used to determine, upon receiving a write request of the uplink object, whether the control streaming dam is writable according to a state of the uplink control pin; and a second logic unit, which is connected to a downlink object and the downlink control pin, and is used to determine, upon receiving a read request of the downlink object, whether the control streaming dam is readable according to a state of the downlink control pin.

9 Claims, 2 Drawing Sheets

(56) References Cited

U.S. PATENT DOCUMENTS

| | | | | | |
|---|---|---|---|---|---|
| 5,020,132 | A | * | 5/1991 | Nazarenk | H04L 1/1607 455/17 |
| 5,218,680 | A | * | 6/1993 | Farrell | H04L 29/06 370/433 |
| 5,255,136 | A | * | 10/1993 | Machado | G11B 5/59655 360/77.02 |
| 5,430,842 | A | * | 7/1995 | Thompson | H04L 29/06 709/224 |
| 6,249,756 | B1 | * | 6/2001 | Bunton | G06F 5/06 370/414 |
| 6,314,477 | B1 | * | 11/2001 | Cowger | H04L 47/10 370/394 |
| 6,336,157 | B1 | * | 1/2002 | Carbonaro | H04L 49/90 710/5 |
| 6,578,096 | B1 | * | 6/2003 | Steinmetz | G06F 13/385 710/104 |
| 2002/0194291 | A1 | * | 12/2002 | Najam | H04L 49/103 709/213 |
| 2004/0064660 | A1 | * | 4/2004 | Lyons | G06F 13/4243 711/167 |

* cited by examiner

STREAM PROCESSING INTERFACE STRUCTURE, ELECTRONIC DEVICE AND ELECTRONIC APPARATUS

CROSS-REFERENCE TO RELATED APPLICATIONS

This is a National Stage Application, filed under 35 U.S.C. 371, of International Patent Application No. PCT/CN2018/072661 filed on Jan. 15, 2018, the content of which is incorporated herein by reference in its entirety.

TECHNICAL FIELD

The disclosure relates to the technical field of processors, particularly to the technical field of artificial intelligence processors, and specifically to a streaming processing interface structure, an electronic device and an electronic apparatus.

BACKGROUND

Convolutional neural network (CNN) is a feed-forward neural network, which has artificial neurons that can respond to some of the surrounding cells within a coverage area of the artificial neurons, and has excellent performance for large-scale image processing. The convolutional neural network includes a convolutional layer and a pooling layer.

Now, CNN has become one of the research hotspots in many scientific fields, especially in the field of pattern classification. Since the network avoids the complex pre-processing of images and can have original images inputted directly, the network has been used more widely.

The CNN is mainly used to identify two-dimensional graphics which are invariant under displacement, scaling and other distortion forms. Since the feature detection layer of the CNN learns from the training data, the use of the CNN avoids explicit feature extraction and implicitly learns from the training data; moreover, since the neurons on the same feature mapping plane have the same weight, the network can learn in parallel. This is also a big advantage of convolutional networks over networks where neurons are connected to each other. The convolutional neural network with a special structure of local weight sharing has unique superiority in the aspects of voice recognition and image processing, the complexity of the network is reduced by weight sharing, and particularly, the complexity of data reconstruction in the processes of feature extraction and classification is avoided by the characteristic that images of multidimensional input vectors can be directly input into the network.

If the convolutional neural network is realized by a hardware convolver or deconvolver, interfaces are required for communication and data transmission among elements in the convolver or deconvolver. At present, all existing communication interfaces need to establish a communication connection through a communication protocol and defining an address. If multiple communication interfaces exist, the communication speed is relatively reduced, and the overall performance of the convolver or deconvolver is impacted.

SUMMARY

In view of the above-mentioned shortcomings of the related art, the object of the present disclosure is to provide a streaming processing interface structure, an electronic device and an electronic apparatus.

In order to achieve the above object and other related objects, the present disclosure provides a streaming processing interface structure. The streaming processing interface structure includes: a control streaming dam, including an uplink control pin and a downlink control pin; a first logic unit, which is connected to an uplink object and the uplink control pin, and is used to determine, upon receiving a write request of the uplink object, whether the control streaming dam is writable according to a state of the uplink control pin; and a second logic unit, which is connected to a downlink object and the downlink control pin, and is used to determine, upon receiving a read request of the downlink object, whether the control streaming dam is readable according to a state of the downlink control pin.

In an embodiment of the present disclosure, the uplink control pin includes: an uplink write enable pin, a data input pin, and an uplink compute logic pause state identification pin.

In an embodiment of the present disclosure, determining whether the control streaming dam is writable according to the state of the uplink control pin specifically includes: determining whether the control streaming dam is full according to a signal on the uplink compute logic pause state identification pin; if the control streaming dam is not full, making the control streaming dam writeable by sending an enable signal to the writeable enable pin; otherwise, making the control streaming dam not writeable.

In an embodiment of the present disclosure, the first logic unit includes: a first inverter, which includes an input end connected to the uplink compute logic pause state identification pin, and an output end leading to an uplink data identification end for connecting to the uplink object; and a first AND gate, which includes a first input end connected to the uplink data identification end, a second input end connected to an uplink data valid end for connecting to the uplink object, and an output end connected to the write enable pin.

In an embodiment of the present disclosure, the downlink control pin includes: a downlink read enable pin, a data output pin, and a downlink compute logic pause state identification pin.

In an embodiment of the present disclosure, determining whether the control streaming dam is readable according to the state of the downlink control pin specifically includes: upon receiving the read request of the downlink object, determining whether the control streaming dam is empty according to a signal on the downlink compute logic pause state identification pin; if the control streaming dam is not empty, making the control streaming dam readable by sending an enable signal to the read enable pin; otherwise, making the control streaming dam not readable.

In an embodiment of the present disclosure, the second logic unit includes: a second inverter, which includes an input end connected to the downlink compute logic pause state identification pin, and an output end leading to an downlink data valid end for connecting to the downlink object; and a second AND gate, which includes a first input end connected to the downlink data valid end, and a second input end connected to a downlink data identification end for connecting to the downlink object.

An embodiment of the present disclosure also provides an electronic device, including at least one streaming processing interface structure described above.

In an embodiment of the present disclosure, the electronic device includes a convolver and a deconvolver, where connection between internal components included in the convolver, connection between internal components included in the deconvolver, connection between the convolver and an external memory, and connection between the deconvolver and the external memory are each implemented through an data interface.

An embodiment of the present disclosure also provides an electronic apparatus, including the streaming processing interface structure described above.

As described above, the streaming processing interface structure, electronic device and electronic apparatus of the present disclosure have the following beneficial effects.

DESCRIPTION OF REFERENCE SIGNS

Figure 1:
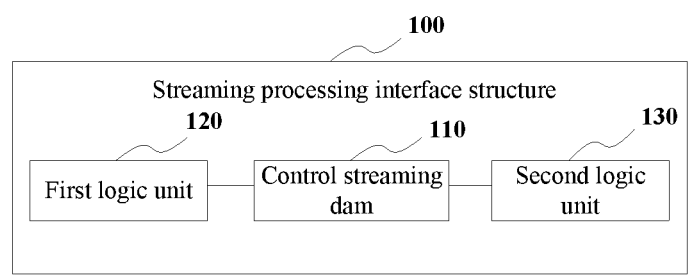
FIG. 1 is a schematic diagram of the overall principle of a streaming processing interface structure in the related art.

100: Streaming processing interface structure
10: Control streaming dam
120: First logical unit
121: First inverter
122: First AND gate
130: Second logical unit
131: Second inverter
132: Second AND gate

DETAILED DESCRIPTION

Embodiments of the disclosure are illustrated by specific examples below, and those skilled in the art may easily understand other advantages and effects of the present disclosure from the content disclosed in the description. The present disclosure may also be implemented or applied through different specific embodiments. The details in the description may also be based on different viewpoints and applications, and various modifications or changes may be made without departing from the spirit of the present disclosure. It is to be noted that if not in collision, the embodiments and features therein may be combined with each other.

Figure 2:
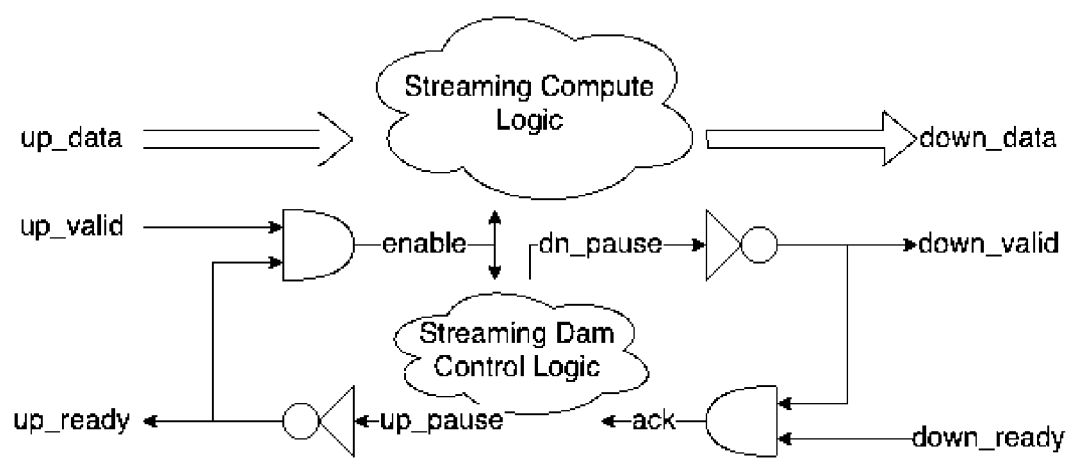
FIG. 2 is a schematic diagram of input and output of a streaming processing interface structure of the present disclosure.

It is to be noted that, as shown in FIGS. 1 to 2, the drawings provided in the following embodiments merely schematically illustrate the basic concept of the present disclosure, and the drawings only show the components related to the present disclosure and are not drawn according to the number, shape and size of the components in actual implementation, the type, number and scale of the components may be changed arbitrarily, and the layout of the components may be more complex.

The object of the embodiments is to provide a streaming processing interface structure, an electronic device and an electronic apparatus. The following will describe in detail the principle and implementation of the streaming processing interface structure, electronic device, and electronic apparatus in the embodiment, so that those skilled in the art may understand the streaming processing interface structure, electronic device, and electronic apparatus of the embodiment without creative work.

Specifically, as shown in FIG. 1, an embodiment provides a streaming processing interface structure 100. The streaming processing interface structure 100 includes a control streaming dam 110, a first logic unit 120, and a second logic unit 130.

In the embodiment, the control streaming dam 110 includes: an uplink control pin and a downlink control pin.

Specifically, in the embodiment, as shown in FIG. 2, the uplink control pin includes: an uplink write enable pin, a data input pin, and an uplink compute logic pause state identification pin; and the downlink control pin includes: a downlink read enable pin, a data output pin, and a downlink compute logic pause state identification pin.

That is, as shown in FIG. 2, an data interface includes: a control streaming dam 110, including: the uplink write enable pin (write), the data input pin (data_in), and the uplink compute logic pause state identification pin (full); and the downlink read enable pin (read), the data output pin (data_out), and the downlink compute logic pause state identification pin (empty).

In the embodiment, the first logic unit 120 is connected to an uplink object and the uplink control pin, and is used to determine, upon receiving a write request of the uplink object, whether the control streaming dam 110 is writable according to a state of the uplink control pin.

In the embodiment, the determination of whether the control streaming dam 110 is writable according to the state of the uplink control pin specifically includes to determine whether the control streaming dam 110 is full according to a signal on the uplink compute logic pause state identification pin; if the control streaming dam 110 is not full, to make the control streaming dam 110 writeable by sending an enable signal to the writeable enable pin; otherwise, to make the control streaming dam 110 not writeable.

Specifically, as shown in FIG. 2, in the embodiment, the first logic unit 120 includes: a first inverter 121, which includes an input end connected to the uplink compute logic pause state identification pin, and an output end leading to an uplink data identification end for connecting to the uplink object; and a first AND gate 122, which includes a first input end connected to the uplink data identification end, a second input end connected to an uplink data valid end for connecting to the uplink object, and an output end connected to the write enable pin.

In the embodiment, a second logic unit 130 is connected to a downlink object and the downlink control pin, and is used to determine, upon receiving a read request of the downlink object, whether the control streaming dam 110 is readable according to a state of the downlink control pin.

In the embodiment, the determination of whether the control streaming dam 110 is readable according to the state of the downlink control pin specifically includes, upon receiving the read request of the downlink object, to determine whether the control streaming dam 110 is empty according to a signal on the downlink compute logic pause state identification pin; if the control streaming dam 110 is not empty, to make the control streaming dam 110 readable by sending an enable signal to the read enable pin; otherwise, to make the control streaming dam 110 not readable.

Specifically, in the embodiment, as shown in FIG. 2, the second logic unit 130 includes: a second inverter 131, which includes an input end connected to the downlink compute logic pause state identification pin, and an output end leading to an downlink data valid end for connecting to the downlink object; and a second AND gate 132, which includes a first input end connected to the downlink data valid end, and a second input end connected to a downlink data identification end for connecting to the downlink object.

The first logic unit 120 is connected to the uplink object, the write enable pin and the uplink compute logic pause state identification pin, and is used to determine, upon receiving a write request of the uplink object, whether the control streaming dam 110 is full according to a state of the uplink control pin; if the control streaming dam 110 is not full, make the control streaming dam 110 writeable by sending an enable signal to the writeable enable pin; otherwise, make the control streaming dam 110 not writeable.

The second logic unit 130 is connected to an downlink object, the read enable pin and the downlink compute logic pause state identification pin, and is used to determine whether the control streaming dam 110 is empty according to a signal on the downlink compute logic pause state identification pin; if the control streaming dam 110 is not empty, make the control streaming dam 110 readable by sending an enable signal to the read enable pin; otherwise, make the control streaming dam 110 not readable.

In the embodiment, the control streaming dam is writable when the write enable pin (write) is set to "1", the control streaming dam is not writable when the write enable pin is set to "0"; the uplink compute logic pause state identification pin (full) is set to "1" when the control streaming dam is full; when the read enable pin (read) is set to "1", the control streaming dam is readable, when the read enable pin is set to "0", the control streaming dam is not readable; the downlink compute logic pause state identification pin (empty) is set to "1" when the control streaming dam is empty.

As shown in FIG. 2, when the control streaming dam is full, the uplink compute logic pause state identification pin (full) is set to "1", "0" is output to an input end of the first AND gate 122 through the first inverter 121, so that the output of the first AND gate 122 is "0", and the control streaming dam is not writeable; and when the control streaming dam is empty, the downlink compute logic pause state identification pin (empty) is set to "1", "0" is output to an input end of the second AND gate 122 through the second inverter 131, so that the output of the second AND gate 132 is "0", and the control streaming dam is not readable.

Of course, in other embodiments, the digital voltage value indicating the state of each pin may be replaced, for example, enable in case of "0", which is not limited to the above embodiments; in addition, the first logic unit 120 and the second logic unit 130 may also adopt other logic operation components, and are not limited to FIG. 2.

An embodiment of the present disclosure also provides an electronic device, including at least one streaming processing interface structure 100 described above.

In an embodiment of the present disclosure, the electronic device includes a convolver and a deconvolver, where connection between internal components included in the convolver, connection between internal components included in the deconvolver, connection between the convolver and an external memory, and connection between the deconvolver and the external memory are each implemented through an data interface.

An embodiment of the present disclosure also provides an electronic apparatus, including the streaming processing interface structure 100 described above.

In summary, the streaming processing interface structure of the present disclosure includes the control streaming dam, the first logic unit used to determine whether the control streaming dam is writable according to the state of the uplink control pin, and the second logic unit used to determine whether the control streaming dam is readable according to the state of the downlink control pin. Communication data are transmitted in the streaming processing interface structure like continuous running water, so that the pipeline process of data processing is realized, and the communication interface speed is increased.

The above-mentioned embodiments only exemplarily illustrate the principle and efficacy of the present disclosure, and are not intended to limit the present disclosure. Anyone familiar with this technology may modify or change the above embodiments without departing from the spirit and scope of the present disclosure. Therefore, all equivalent modifications or changes made by those with ordinary knowledge in the technical field without departing from the spirit and technical idea disclosed by the present disclosure should still be covered by the claims of the present disclosure.

What is claimed is:

1. A streaming processing interface structure, comprising:
    a control streaming dam, including an uplink control pin and a downlink control pin;
    a first logic unit, which is connected to an uplink object and the uplink control pin, and is used to determine, upon receiving a write request of the uplink object, whether the control streaming dam is writable according to a state of the uplink control pin; and
    a second logic unit, which is connected to a downlink object and the downlink control pin, and is used to determine, upon receiving a read request of the downlink object, whether the control streaming dam is readable according to a state of the downlink control pin;
    wherein the uplink control pin comprises: an uplink write enable pin, a data input pin, and an uplink compute logic pause state identification pin;
    the downlink control pin comprises: a downlink read enable pin, a data output pin, and a downlink compute logic pause state identification pin:
    wherein the first logic unit comprises:
        a first inverter, which is connected to the uplink object and the uplink compute logic pause state identification pin; and
        a first AND gate, which is connected to the downlink object and the uplink write enable pin; and
    wherein the second logic unit comprises:
        a second inverter, which is connected to the downlink object and the downlink compute logic pause state identification pin; and
        a second AND gate, which is connected to the downlink object and the downlink read enable pin.

2. The streaming processing interface structure of claim 1, wherein determining whether the control streaming dam is writable according to the state of the uplink control pin specifically comprises:
    determining whether the control streaming dam is full according to a signal on the uplink compute logic pause state identification pin; in response to determining that the control streaming dam is not full, making the control streaming dam writeable by sending an enable signal to the writeable enable pin; otherwise, making the control streaming dam not writeable.

3. The streaming processing interface structure of claim 1, wherein the first inverter comprises an input end connected to the uplink compute logic pause state identification pin, and an output end leading to an uplink data identification end for connecting to the uplink object; and
    the first AND gate comprises a first input end connected to the uplink data identification end, a second input end connected to an uplink data valid end for connecting to the uplink object, and an output end connected to the uplink write enable pin.

4. The streaming processing interface structure of claim 1, wherein determining whether the control streaming dam is readable according to the state of the downlink control pin specifically comprises:

upon receiving the read request of the downlink object, determining whether the control streaming dam is empty according to a signal on the downlink compute logic pause state identification pin; in response to determining that the control streaming dam is not empty, making the control streaming dam readable by sending an enable signal to the downlink read enable pin; otherwise, making the control streaming dam not readable.

5. The streaming processing interface structure of claim 1, wherein the second inverter comprises an input end connected to the downlink compute logic pause state identification pin, and an output end leading to a downlink data valid end for connecting to the downlink object; and the second AND gate comprises a first input end connected to the downlink data valid end, a second input end connected to a downlink data identification end for connecting to the downlink object, and an output end connected to the downlink read enable pin.

6. An electronic device, comprising:

at least one streaming processing interface structure, the streaming processing interface structure, comprising:
a control streaming dam, including an uplink control pin and a downlink control pin;
a first logic unit, which is connected to an uplink object and the uplink control pin, and is used to determine, upon receiving a write request of the uplink object, whether the control streaming dam is writable according to a state of the uplink control pin: and
a second logic unit, which is connected to a downlink object and the downlink control pin, and is used to determine, upon receiving a read request of the downlink object, whether the control streaming dam is readable according to a state of the downlink control pin:

wherein the uplink control pin comprises: an uplink write enable pin, a data input pin, and an uplink compute logic pause state identification pin; the downlink control pin comprises: a downlink read enable pin, a data output pin, and a downlink compute logic pause state identification pin:

wherein the first logic unit comprises:
a first inverter, which is connected to the uplink object and the uplink compute logic pause state identification pin; and
a first AND gate, which is connected to the downlink object and the uplink write enable pin: and wherein the second logic unit comprises:

a second inverter, which is connected to the downlink object and the downlink compute logic pause state identification pin: and
a second AND gate, which is connected to the downlink object and the downlink read enable pin.

7. The electronic device of claim 6, wherein the electronic device comprises a convolver and a deconvolver, wherein connection between internal components comprised in the convolver, connection between internal components comprised in the deconvolver, connection between the convolver and an external memory, and connection between the deconvolver and the external memory are each implemented through a data interface.

8. An electronic apparatus, comprising an electronic device: comprising at least one streaming processing interface structure, the streaming processing interface structure, comprising:

a control streaming dam, including an uplink control pin and a downlink control pin;
a first logic unit, which is connected to an uplink object and the uplink control pin, and is used to determine, upon receiving a write request of the uplink object, whether the control streaming dam is writable according to a state of the uplink control pin: and
a second logic unit, which is connected to a downlink object and the downlink control pin, and is used to determine, upon receiving a read request of the downlink object, whether the control streaming dam is readable according to a state of the downlink control pin:

wherein the uplink control pin comprises: an uplink write enable pin, a data input pin, and an uplink compute logic pause state identification pin; the downlink control pin comprises: a downlink read enable pin, a data output pin, and a downlink compute logic pause state identification pin:

wherein the first logic unit comprises:
a first inverter, which is connected to the uplink object and the uplink compute logic pause state identification pin; and
a first AND gate, which is connected to the downlink object and the uplink write enable pin; and wherein the second logic unit comprises:
a second inverter, which is connected to the downlink object and the downlink compute logic pause state identification pin; and
a second AND gate, which is connected to the downlink object and the downlink read enable pin.

9. The electronic apparatus of claim 8, wherein the electronic device comprises a convolver and a deconvolver, wherein connection between internal components comprised in the convolver, connection between internal components comprised in the deconvolver, connection between the convolver and an external memory, and connection between the deconvolver and the external memory are each implemented through an data interface.

* * * * *